(12) United States Patent
Edahiro et al.

(10) Patent No.: US 7,464,377 B2
(45) Date of Patent: Dec. 9, 2008

(54) APPLICATION PARALLEL PROCESSING SYSTEM AND APPLICATION PARALLEL PROCESSING METHOD

(75) Inventors: Masato Edahiro, Tokyo (JP); Junji Sakai, Tokyo (JP); Tetsuya Minakami, Tokyo (JP); Yoshiyuki Ito, Tokyo (JP); Hiroaki Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 864 days.

(21) Appl. No.: 10/421,717

(22) Filed: Apr. 24, 2003

(65) Prior Publication Data

US 2003/0212732 A1 Nov. 13, 2003

(30) Foreign Application Priority Data

May 9, 2002 (JP) ............................. 2002-134495

(51) Int. Cl.
G06F 9/46 (2006.01)
G06F 15/16 (2006.01)

(52) U.S. Cl. ................. 718/100; 719/310; 719/320; 709/203; 709/208; 709/217

(58) Field of Classification Search ......... 719/310–332; 718/1, 100–108; 707/1–203; 709/200–253
See application file for complete search history.

(56) References Cited

U.S. PATENT DOCUMENTS

| 4,539,637 | A |   | 9/1985 | DeBruler |
| 5,590,281 | A |   | 12/1996 | Stevens |
| 5,842,014 | A | * | 11/1998 | Brooks et al. ............... 718/103 |
| 5,903,728 | A | * | 5/1999 | Semenzato ................. 709/217 |
| 6,321,373 | B1 |   | 11/2001 | Ekanadham et al. |
| 6,594,691 | B1 | * | 7/2003 | McCollum et al. .......... 709/218 |
| 6,651,084 | B1 | * | 11/2003 | Kelley et al. ................ 709/202 |
| 6,691,176 | B1 | * | 2/2004 | Narin et al. ................. 719/318 |
| 6,981,108 | B1 | * | 12/2005 | Zeira et al. .................. 711/152 |
| 7,069,562 | B2 | * | 6/2006 | Kushnirskiy et al. ........ 719/328 |
| 7,080,386 | B2 | * | 7/2006 | Thrift et al. ................. 719/328 |
| 7,140,016 | B2 | * | 11/2006 | Milovanovic et al. ....... 718/100 |

FOREIGN PATENT DOCUMENTS

| EP | 1 298 664 A1 | 4/2003 |
| GB | 1 576 276 | 10/1980 |

* cited by examiner

Primary Examiner—Meng-Ai An
Assistant Examiner—Jennifer N To
(74) Attorney, Agent, or Firm—Foley & Lardner LLP

(57) ABSTRACT

In the application parallel processing system, on specific one of processors forming a multi-processor, an application is operated independently of other processors and on other processors, a function expansion module is operated in parallel processing under control of the application. As a result, even in such a data processing device internally provided with a processor whose processing capacity is small as a portable terminal, applications can be operated smoothly.

7 Claims, 8 Drawing Sheets

APPLICATION PARALLEL PROCESSING SYSTEM AND APPLICATION PARALLEL PROCESSING METHOD

BACKGROUND OF THE INVENTION

1. Field of the Invention

The present invention relates to an application parallel processing system employing a multi-processor and, more particularly, to an application parallel processing system which realizes, on a multi-processor, parallel processing of such an application as browser and a function expansion module such as add-in software or plug-in executed by the application in question.

2. Description of the Related Art

Conventional application having a function of executing software for function expansion of an application (hereinafter referred to as function expansion module) such as add-in software or plug-in is designed to be executed on the same processor together with its function expansion module.

With reference to FIG. 8, a conventional system structure will be described which executes a browser as an application having a function of executing a function expansion module.

In the system shown in FIG. 8, on a data processing device 500 formed of a single processor, a browser 600 runs which has a document reading unit 610 for interpreting an HTML document to conduct display processing and a function expansion unit 620 for executing plug-in etc. as a function expansion module. The function expansion unit 620 is provided as many as the kinds of function expansion modules to be executed.

Operation in a case of executing HTML document display processing in the above-described system is as follows. First, the document reading unit 610 reads a relevant HTML document from a main storage device 550 or an external storage device to interpret and display the read HTML document ((1) in FIG. 8).

When a function expansion statement including an instruction related to a function expansion module is interpreted in the HTML document, processing corresponding to the instruction in question is notified to the function expansion unit 620 equivalent to the relevant function expansion module by such a method as function call ((2) in FIG. 8).

According to the notified processing request, the function expansion unit 620 having received the notification controls generation of a function expansion task 700 ((3) in FIG. 8).

Through the foregoing operation, the browser 600 and the plug-in as its function expansion module are executed on the processing device 500.

Such application having a function of executing a function expansion module as described above has its processing be heavier than that of other application having no function expansion module and is designed to be executed basically on a single processor together with its function expansion module.

Therefore, operating such application having a function of executing a function expansion module as described above in data processing devices internally provided with a single processor whose processing capacity is not so large such as portable terminals including a cellular phone and a portable PC will result in making processing be heavier to disable speedy operation.

On the other hand, enhancing a processing speed of an application having a function of executing a function expansion module by increasing an operating frequency to improve a processor processing capacity invites an increase in power consumption, which is not preferable for data processing devices such as portable terminals including a cellular phone and a portable PC whose long-time drive with low power consumption is demanded.

Although operating the above-described application on a multi-processor eliminates the above-described problems, for operating the application on a multi-processor, modification for a multi-processor should be added to the above-described application, which causes another problem of enormous labor and costs for the modification.

SUMMARY OF THE INVENTION

An object of the present invention is to provide an application parallel processing system enabling, without making any modification in an existing application operable on a single processor and having a function of executing a function expansion module, parallel processing of the application and its function expansion modules such as add-in software and a plug-in on a multi-processor.

Another object of the present invention is to provide an application parallel processing system which conducts, on a multi-processor, parallel processing of an application and its function expansion modules such as add-in software and a plug-in to enable the application to operate comfortably even in such a data processing device internally provided with a processor whose single processing capacity is small as a portable terminal.

A further object of the present invention is to provide an application parallel processing system which conducts, on a multi-processor, parallel processing of an application and its function expansion modules such as add-in software and a plug-in to make power consumption be lower than that required when they are operated on a single processor.

According to one aspect of the invention, an application parallel processing system which operates an application having a function of executing function expansion modules including add-in software and a plug-in on a multi-processor, wherein on one of processors forming the multi-processor, the application is operated, and on any of the processors, the function expansion module is operated under control of the application.

In the preferred construction, on specific one of processors forming the multi-processor, the application is operated independently of other processors, and on other processors, the function expansion module is operated in parallel processing under control of the application.

In another preferred construction, at the time of activation of the application, the function expansion module correlated in advance is loaded in the other processor.

In another preferred construction, on specific of processors forming the multi-processor, the application is operated independently of other processors, on other processors, the function expansion module is operated in parallel processing under control of the application, and at the time of activation of the application, the function expansion module correlated in advance is loaded in the other processor.

In another preferred construction, the application includes execution means for executing an original function and control means for controlling execution of the function expansion module, and the other processor is mounted with subsidiary means for controlling execution of the function expansion module as an agent of the control means in response to an instruction from the control means.

In another preferred construction, the application is a browser for displaying an HTML document, and the function expansion module is a plug-in to be executed by the browser.

In another preferred construction, the application is a browser for displaying an HTML document, the function expansion module is a plug-in to be executed by the browser, on specific one of processors forming the multi-processor, the application is operated independently of other processors, on other processors, the function expansion module is operated in parallel processing under control of the application, and at the time of activation of the application, the function expansion module correlated in advance is loaded in the other processor.

In another preferred construction, when the need of executing the function expansion module arises in the execution means of the application, the execution means notifies the control means of processing by the function expansion module and receives a response from the control means to the effect that the notification has been received to continue execution of the original function, the control means having received the notification responds to the execution means to the effect that the notification has been received, as well as transmitting the notified processing contents to the subsidiary means of any of the other processors, and the subsidiary means of the other processor controls execution of a predetermined function expansion module based on the processing contents received.

In another preferred construction, the subsidiary means of the other processor controls execution of the function expansion module of a kind predetermined for each processor.

In another preferred construction, the application includes means for managing kinds and the number of the function expansion modules executed by other processors and at the time of executing a new function expansion module, instructs the other processor whose load is small to execute the function expansion module based on the kinds and number of function expansion modules.

In another preferred construction, with the other processor provided with a function of outputting its own load factor momently, the application causes the other processor determined to be most appropriate based on the output load factor to execute a function expansion module.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Without making any modification in an existing application operable on a single processor and capable of executing a function expansion module, the application parallel processing system according to the present invention enables parallel processing of the application and its function expansion modules such as add-in software and a plug-in on a multi-processor.

Preferred embodiment of the present invention will be described in detail with reference to the drawings in the following.

Figure 1:
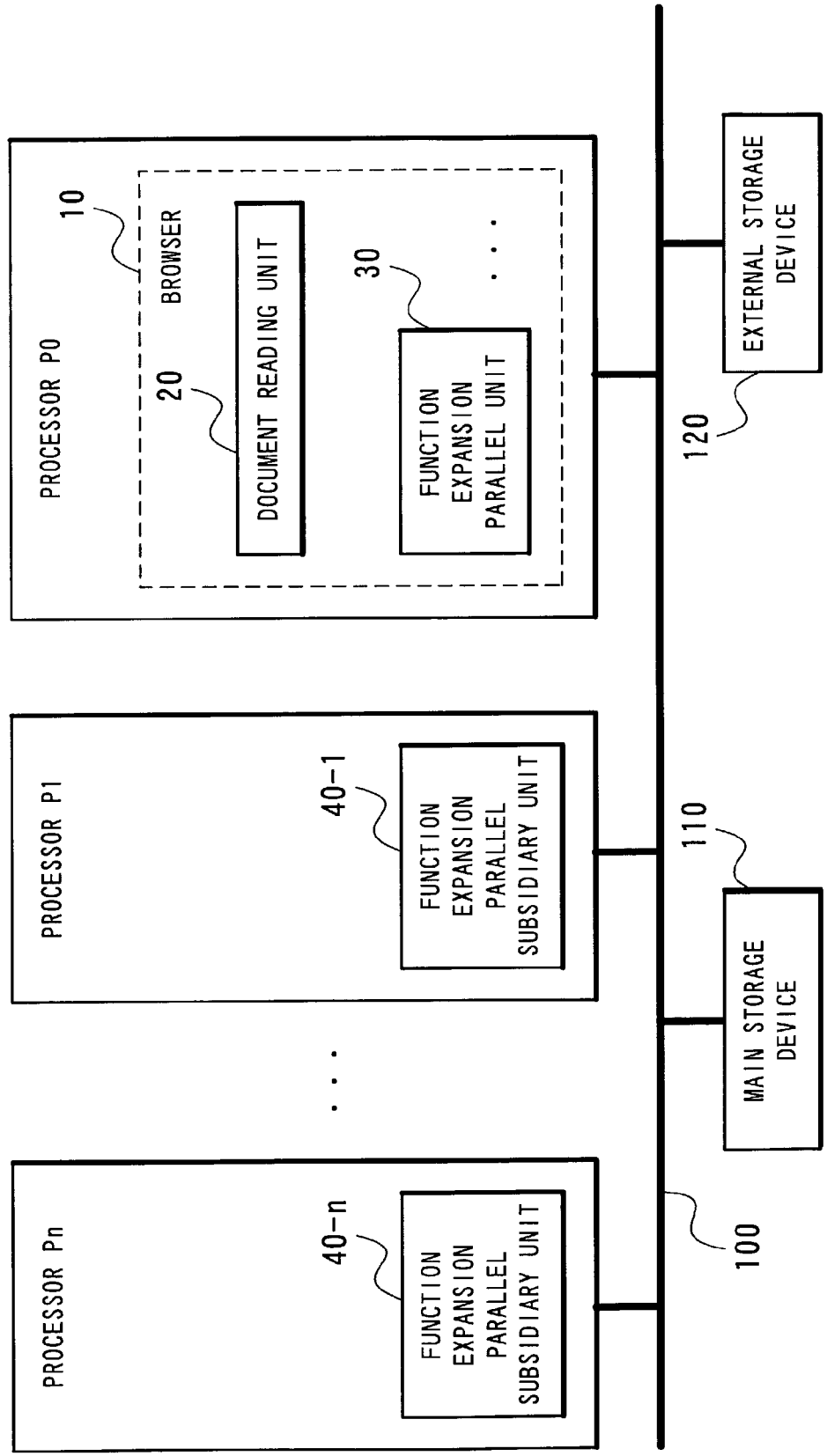
FIG. 1 is a block diagram showing a structure of an application parallel processing system according to a preferred embodiment of the present invention.

FIG. 1 is a block diagram showing a structure of an application parallel processing system according to a preferred embodiment of the present invention.

As shown in FIG. 1, the application parallel processing system according to the present embodiment is realized under the multi-processor environment in which a plurality of processors P0 to Pn (n: integer not less than 1) are provided, and the plurality of processors P0 to Pn are divided into one processor P0 for application which executes an application and one or a plurality of processors P1 to Pn for function expansion modules which execute a function expansion module to be executed by the application in question.

The system is provided in such data processing devices as portable terminals including a cellular phone and a portable PC which have a multi-processor structure with a plurality of processors mounted. Even with data processing devices such as portable terminals including a cellular phone and a portable PC whose individual processor processing capacity is not so large, when mounted with the application parallel processing system of the present invention as a multi-processor structure provided with a plurality of processors, load distribution enables numbers of function expansion modules to be executed smoothly.

The processor here may be a general-purpose CPU or DSP (Digital Signal Processor) or it may, not limited to those, be other dedicated hardware having a data processing capacity.

In addition, the respective processors P0 to Pn are connected to each other through a system bus 100 to which a main storage device 110 as a shared memory shared by the respective processors P0 to Pn and an external storage device 120 such as a disc device are connected.

In the following, description will be made with respect to an example where with an application capable of executing a function expansion module being a browser, a plug-in as a function expansion module is executed by the browser. Other possible function expansion modules than a plug-in include add-in software.

In the application processor P0, a browser 10 is operated which is an application capable of executing a function expansion module and serves for reading an HTML document delivered through the Internet or the like. The browser 10 includes a document reading unit 20 as an original function of interpreting and displaying an HTML document and a function expansion parallel unit 30 for controlling execution of a plug-in as a function expansion module. In the present embodiment, the document reading unit 20 for reading an HTML document which is an original function of the browser 10 is the same as a conventional function that an ordinary browser has and therefore needs no modification.

The function expansion module processors P1 to Pn are respectively mounted with function expansion parallel subsidiary units 40-1 to 40-n for executing various plug-in (function expansion modules) to be executed by the browser 10 on their own processors in parallel processing.

As the plug-in which is a function expansion module to be executed by the browser 10 here, various kinds are usable such as Java (R), Shockwave, Real Player and MEPG4 decoder.

By the same method of directly controlling a function expansion module, the function expansion parallel unit 30 which functions as an interface for notifying processing to the plug-in as a function expansion module of the browser 10 instructs the respective function expansion parallel subsidiary units 40-1 to 40-n of the function expansion module processors P1 to Pn as other processors to execute the function expansion modules. In other words, each of the function expansion parallel subsidiary units 40-1 to 40-n conducts function expansion module execution control as an agent of the function expansion parallel unit 30 based on the notification from the function expansion parallel unit 30. As a result, the function expansion modules executed on the function expansion module processors P1 to Pn operate as if they were directly controlled by the browser 10.

Communication between the function expansion parallel unit 30 and the respective function expansion parallel subsidiary units 40-1 to 40-n is conducted via the system bus 100.

The browser 10 operable in the application processor P0 is assumed to have, for each kind of plug-in as a function expansion module, the function expansion parallel unit 30 which functions as an interface for notifying processing to a plug-in as a function expansion module. In a case, for example, where as the plug-in as a function expansion module, Java (R), Shockwave and MPEG4 decoder are executed, three function expansion parallel units 30 for conducting execution control are provided corresponding to the Java (R), the Shockwave and the MPEG4 decoder. When a single interface is provided for controlling a plurality of plug-in executed by the browser 10, the single function expansion parallel unit 30 controls a plurality of kinds of plug-in.

The function expansion parallel subsidiary units 40-1 to 40-n on the function expansion module processors P1 to Pn each correspond to each kind of plug-in as a function expansion module. For example, the function expansion module processor P1 is mounted with the function expansion parallel subsidiary unit 40-1 for executing Java (R) as a plug-in, the function expansion module processor P2 is mounted with the function expansion parallel subsidiary unit 40-2 for executing Shockwave as a plug-in, and the function expansion module processor P3 is mounted with the function expansion parallel subsidiary unit 40-3 for executing MPEG4 decoder as a plug-in.

Each of the function expansion module processors P1 to Pn may be mounted with a plurality of function expansion parallel subsidiary units corresponding to the respective kinds of plug-in.

Upon interpreting an instruction related to a function expansion module (plug-in) in an HTML document, the document reading unit 20 of the browser 10 notifies plug-in processing to the function expansion parallel unit 30 corresponding to the plug-in in question, and the function expansion parallel unit 30 responsively transmits a message containing processing contents to the function expansion parallel subsidiary unit 40-1~40-n of the function expansion module processor P1~Pn corresponding to the plug-in in question.

Figure 3:
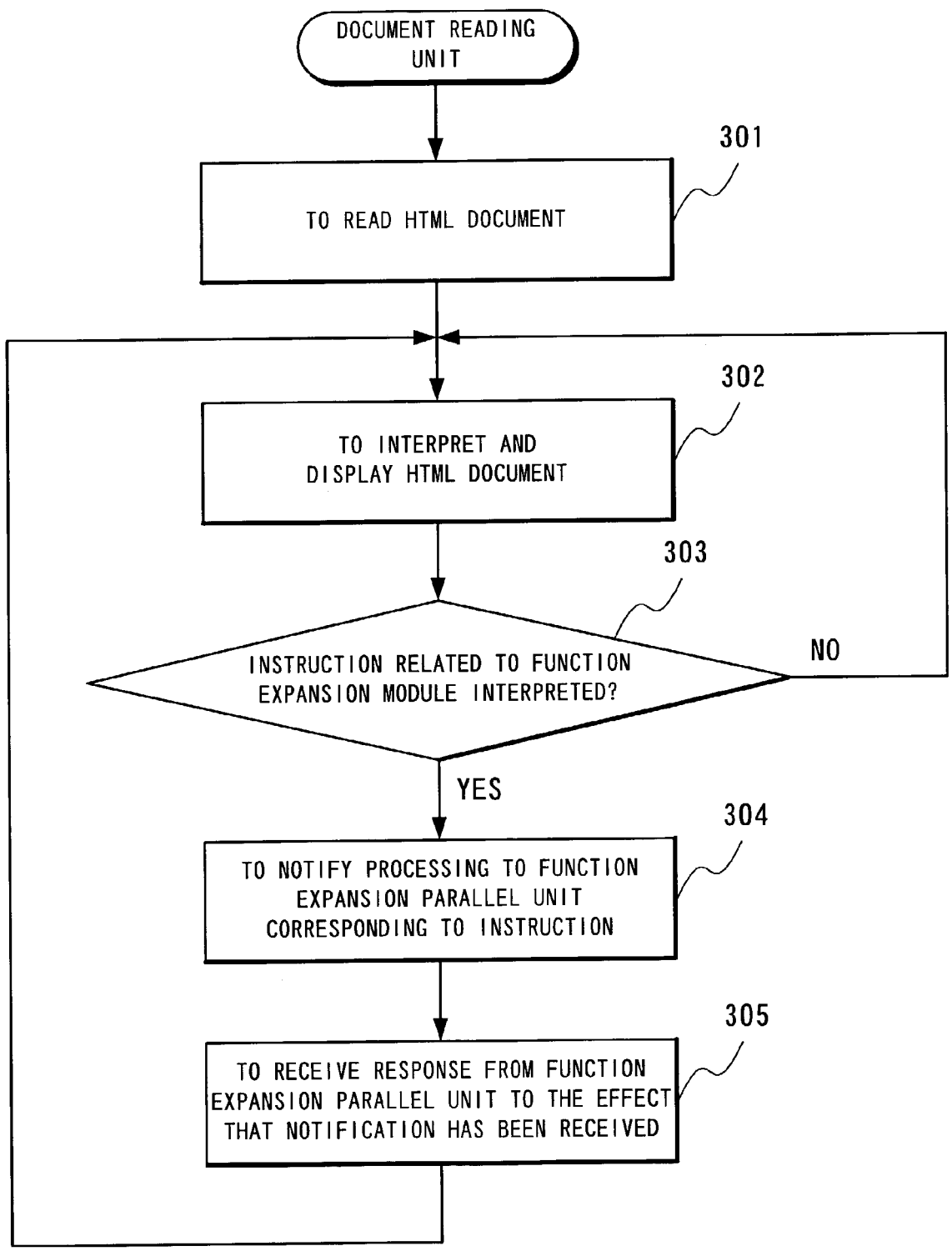
FIG. 3 is a flow chart for use in explaining contents of the processing by a document reading unit of a browser according to the present embodiment.
Figure 4:
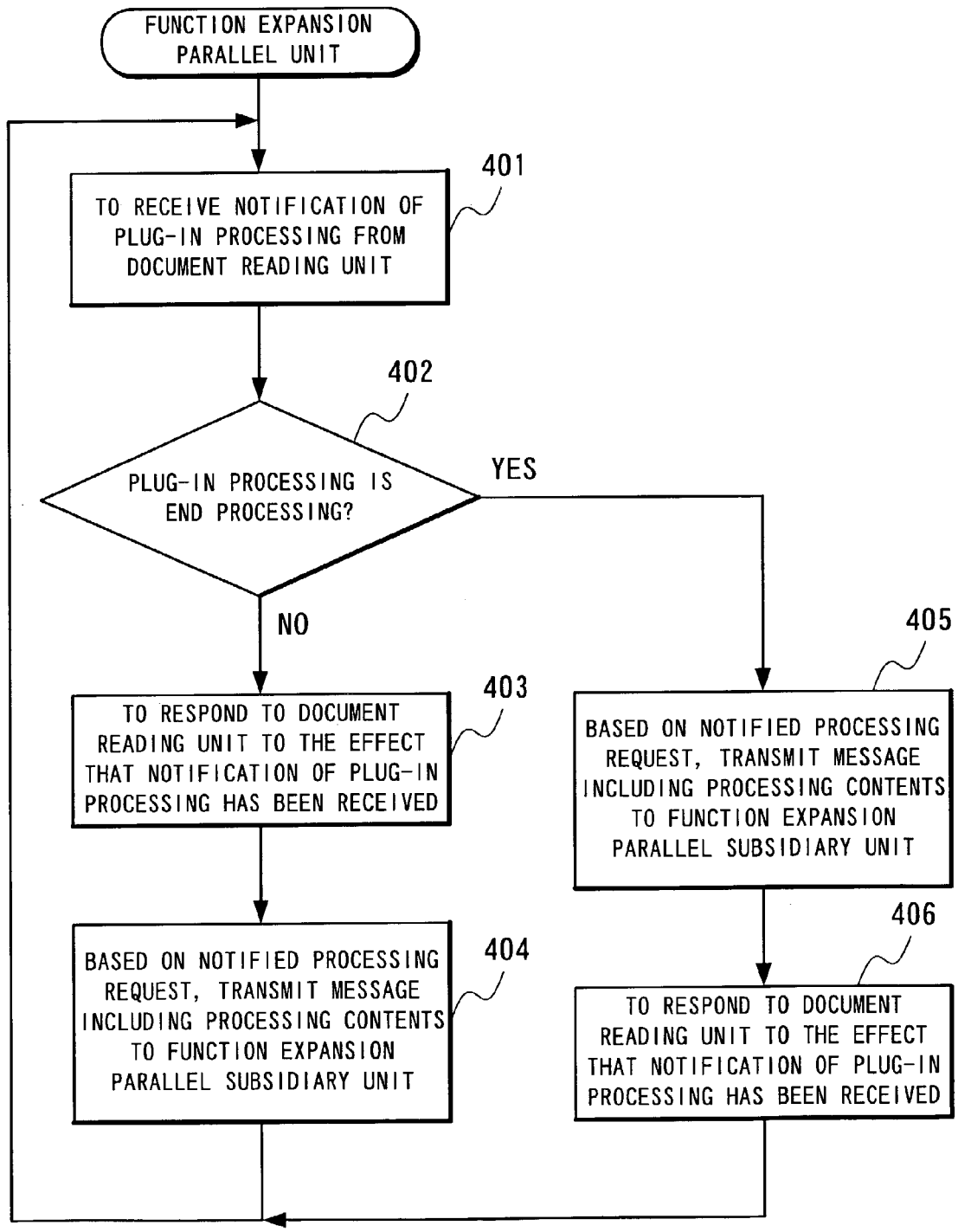
FIG. 4 is a flow chart for use in explaining contents of the processing conducted by a function expansion parallel unit of the browser according to the present embodiment.

Next, operation of thus structured application parallel processing system according to the present embodiment will be described with reference to FIGS. 2 to 4. FIG. 3 is a flow chart for use in explaining processing of the document reading unit 20, while FIG. 4 is a flow chart for use in explaining processing contents conducted by the function expansion parallel unit 30.

The document reading unit 20 of the browser 10 on the application processor P0 reads an HTML document to be displayed from the main storage device 110, the external storage device 120 or the like (Step 301) to execute interpretation and displaying of the HTML document (Step 302).

Figure 2:
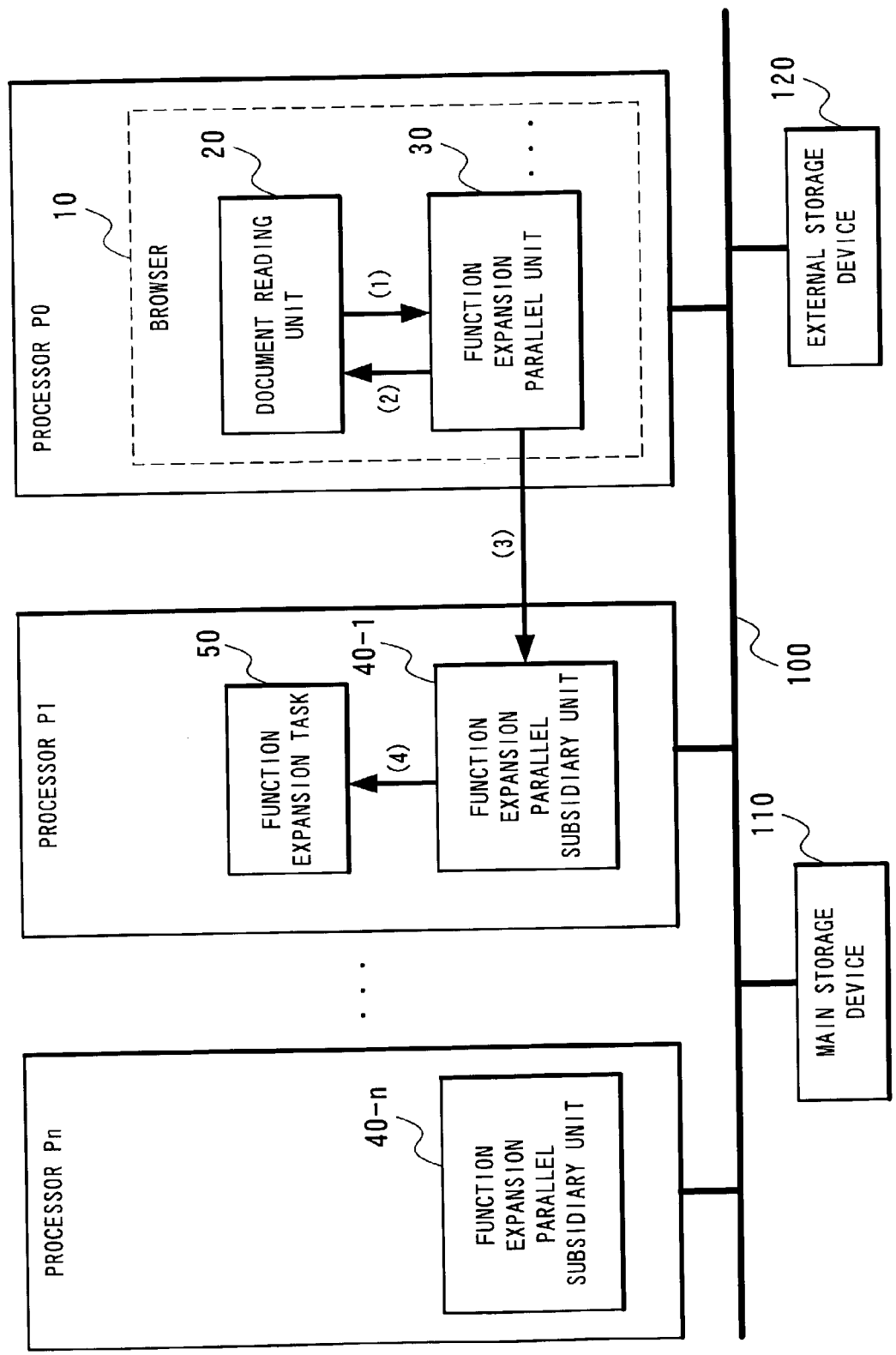
FIG. 2 is a diagram for use in explaining operation of the application parallel processing system according to the present embodiment.

Upon interpreting an instruction related to plug-in processing as a function expansion module in the HTML document (Step 303), give a notification for plug-in processing to the function expansion parallel unit 30 corresponding to the plug-in to be executed by the instruction in question (Step 304, (1) in FIG. 2). The notification to the function expansion parallel unit 30 is conducted, for example, by a method such as function call.

Receiving a response from the function expansion parallel unit 30 to the effect that the notification has been received (Step 305, (2) in FIG. 2), the document reading unit 20 continues execution of interpretation and displaying of the HTML document.

The function expansion parallel unit 30 on the browser 10 receives the notification of plug-in processing from the document reading unit 20 (Step 401, (1) in FIG. 2), as well as determining whether the received notification of plug-in processing indicates end processing of a function expansion task 50 being executed (Step 402).

When the plug-in processing is not the end processing of the function expansion task 50, immediately send a response to the document reading unit 20 to the effect that the notification of the plug-in processing has been received (Step 403, (2) in FIG. 2).

Thereafter, based on the notified processing request, send a message including processing contents to the function expansion parallel subsidiary unit 40-1~40-n of the function expansion module processor P1~Pn corresponding to the plug-in whose processing is to be to executed (Step 404, (3) in FIG. 2).

Then, based on the transmitted message, the function expansion parallel subsidiary units 40-1 to 40-n of the function expansion module processors P1 to Pn generate and execute the function expansion task 50 as the processing by the plug-in.

Results of execution by the function expansion task generated by the function expansion parallel subsidiary units 40-1 to 40-n is transferred from the function expansion parallel subsidiary units 40-1 to 40-n to the document reading unit 20 of the browser 10 and is reflected on displaying.

By thus operating, the document reading unit 20 of the browser 10 is allowed to reflect execution results obtained by the plug-in on the display without interrupting its own execution.

In a case where a page to be read by the document reading unit 20 moves to other page, the document reading unit 20 gives a notification of plug-in processing for conducting end processing of the function expansion task 50 being executed.

When the determination is made at Step 402 that the plug-in processing is the end processing of the function expansion task 50, the function expansion parallel unit 30 sends a message including the processing contents to the function expansion parallel subsidiary unit 40-1~40-n of the function expansion module processor P1~Pn which executes the function expansion task 50 based on the notified processing request without responding to the document reading unit 20 to the effect that the notification has been received (Step 405).

Thereafter, after confirming the end of the function expansion task 50 by the notification from the function expansion parallel subsidiary units 40-1 to 40-n, transmit a response to the document reading unit 20 to the effect that the notification of the plug-in processing has been received (Step 406).

Figure 5:
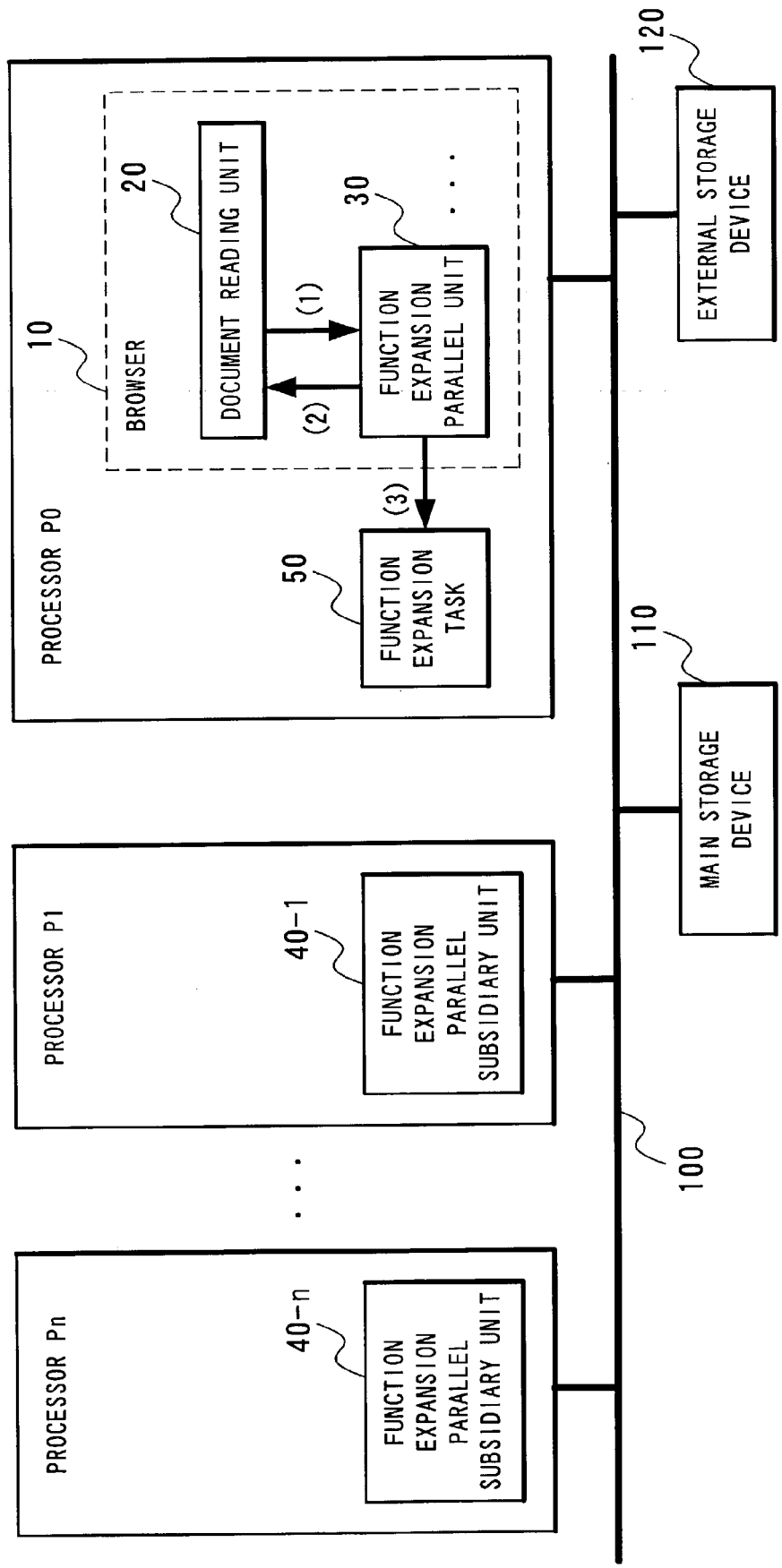
FIG. 5 is a diagram for use in explaining operation of plug-in execution by the function expansion parallel unit of the browser according to the present embodiment.

It is also possible to execute a predetermined plug-in by the function expansion parallel unit 30 on the application processor P0 and in such case, as shown in FIG. 5, the function expansion parallel unit 30, after transmitting a response to the document reading unit 20 to the effect that the notification of the plug-in processing has been received (Step 402, (2) in FIG. 5), generates and executes the function expansion task 50 as the processing by the plug-in based on the notified processing contents ((3) in FIG. 5) without sending a message including the processing contents to the function expansion parallel subsidiary units 40-1 to 40-n of the function expansion module processors P1 to Pn based on the notified processing request.

Figure 6:
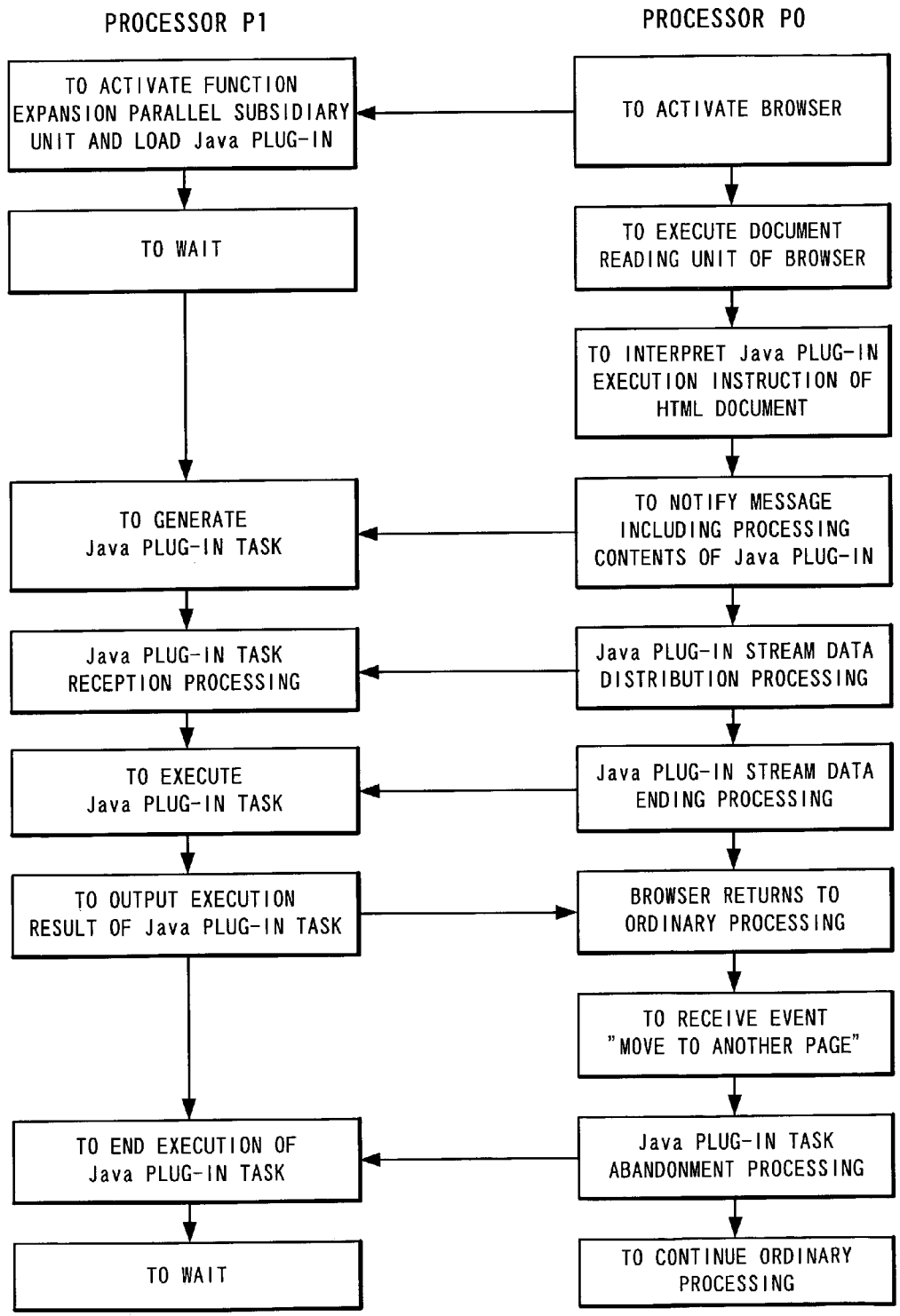
FIG. 6 is a diagram for use in explaining a specific example of operation in a case where the Java(R) plug-in is executed by the browser through a processor for function expansion module.

Here, with reference to FIG. 6, description will be made of a specific example of operation to be executed in a case where assuming that the Java (R) plug-in as a plug-in is to be executed by the function expansion parallel subsidiary unit 40-1 on the function expansion module processor P1, the browser 10 on the application processor P0 executes the Java (R) plug-in on the function expansion module processor P1.

Upon activation of the browser 10 on the application processor P0, the function expansion parallel subsidiary unit 40-1 on the function expansion module processor P1 is activated to load a module for executing the Java (R) plug-in into the function expansion parallel subsidiary unit 40-1.

Since when the browser 10 is activated (also when the browser 10 is being executed), no loading of the plug-in is executed by the browser 10 on the application processor P0, processing time for loading is unnecessary to enable execution of the browser 10 itself to proceed smoothly.

Thereafter, the document reading unit 20 of the browser 10 is executed on the application processor P0 to bring the function expansion parallel subsidiary unit 40-1 on the function expansion module processor P1 to a waiting state.

When the document reading unit 20 interprets an execution instruction of the Java (R) plug-in of the HTML document, the function expansion parallel unit 30 notifies a message including the processing contents of the Java (R) plug-in based on the execution instruction to the function expansion parallel subsidiary unit 40-1 on the function expansion module processor P1. As a result, the function expansion parallel subsidiary unit 40-1 on the function expansion module processor P1 generates a task of the Java (R) plug-in according to the notified processing contents.

Figure 7:
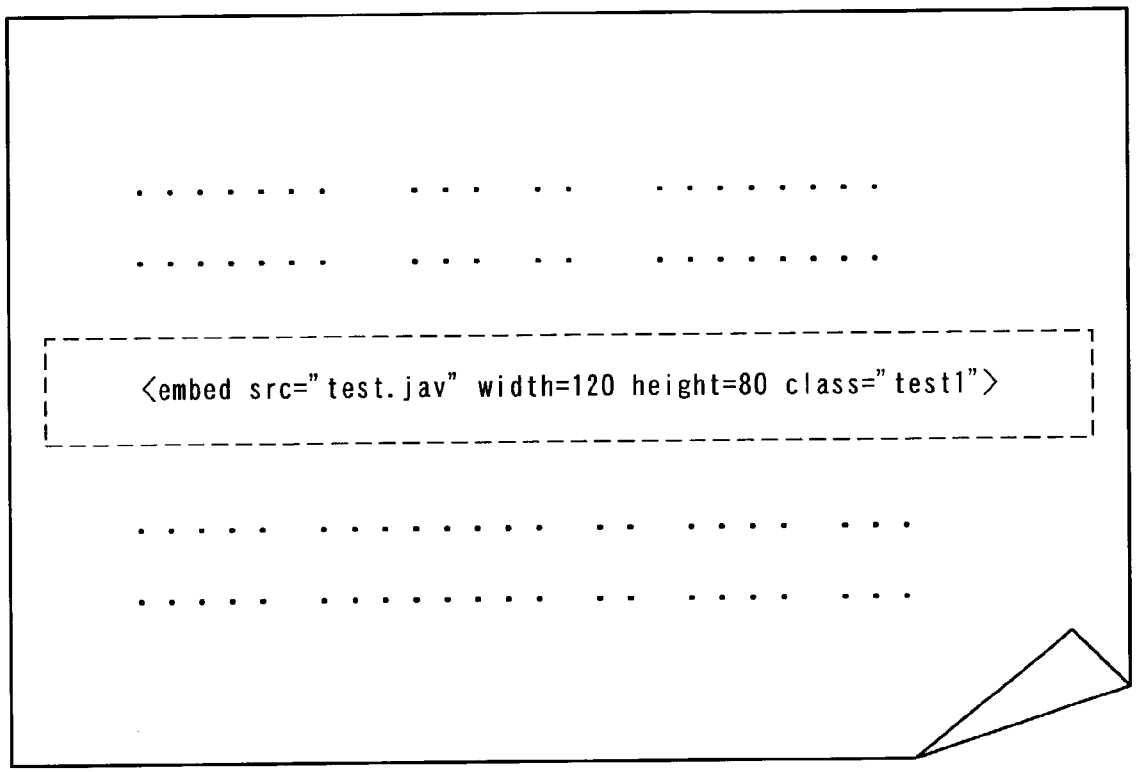
FIG. 7 is a diagram for use in explaining an example of an execution instruction of the Java (R) plug-in in an HTML document.
Figure 8:
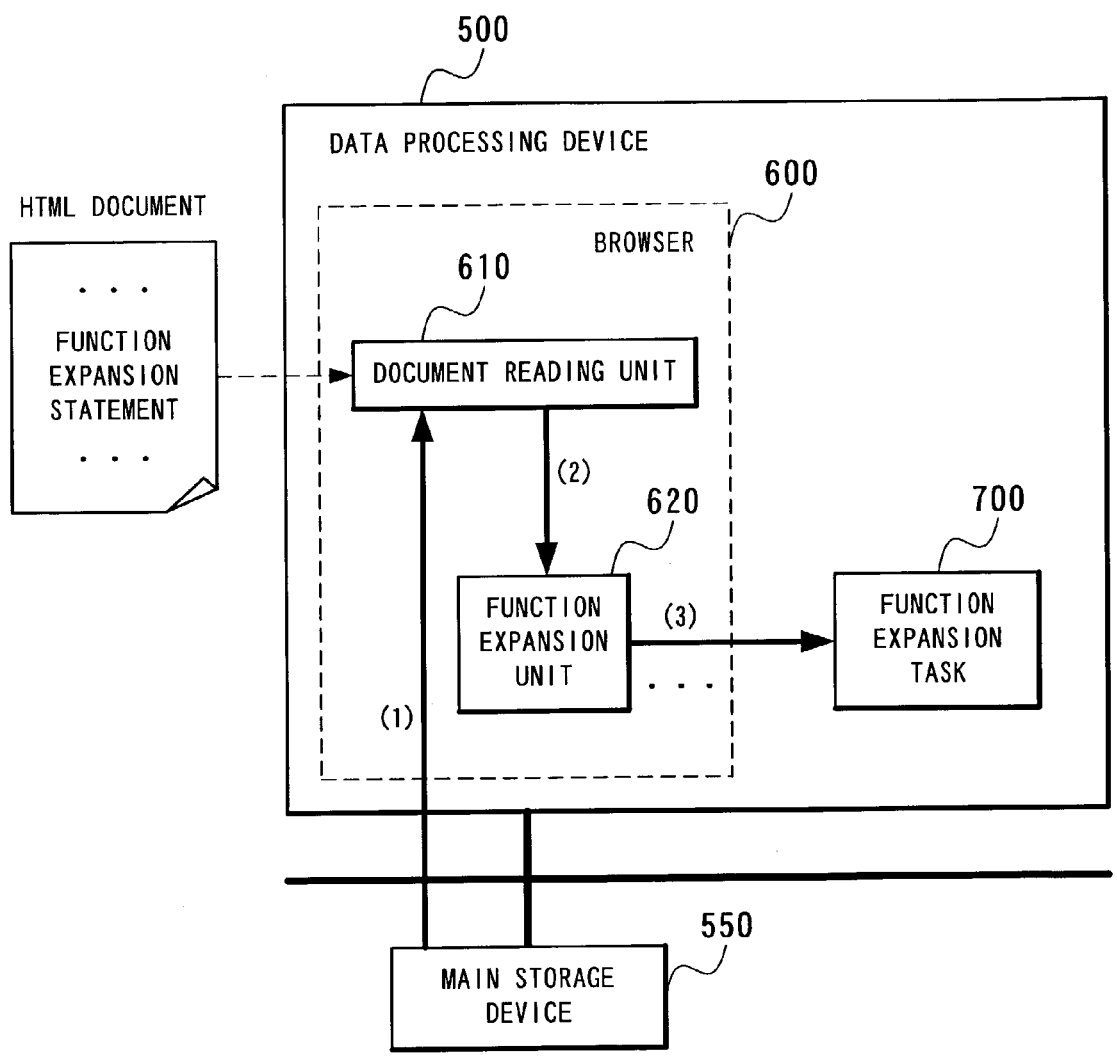
FIG. 8 is a block diagram for use in explaining structure and operation of a conventional system in which on a single processor, a browser capable of executing a function expansion module operates.

An execution instruction of the Java (R) plug-in in the HTML document is described as shown in FIG. 7, for example. Here, a data object [test.jav] of the Java (R) plug-in is to be executed in a predetermined window size.

Subsequently, stream data ("test. jav") to be executed by the Java(R) plug-in task is delivered from the browser 10 on the application processor P0 to the function expansion module processor P1 and the Java (R) plug-in task on the function expansion module processor P1 receives the data.

Upon completion of the delivery of the stream data, the Java (R) plug-in task is executed on the function expansion module processor P1 and a result of the execution is transferred to the browser 10 which is executing ordinary document reading processing.

Thereafter, when such an event as [move to another page] occurs on the browser 10, for example, the function expansion parallel unit 30 notifies a message instructing on Java (R) plug-in task abandonment processing and in response to the notification, the function expansion parallel subsidiary unit 40-1 finishes the execution of the Java (R) plug-in task to enter the waiting state.

In addition, the browser 10 having finished execution of the Java (R) plug-in continues the ordinary processing.

Methods of distributing loads by executing function expansion modules by the function expansion module processors P1 to Pn include such methods as follows other than the method of in advance determining, for each function expansion module, a processor to execute the relevant module.

The browser 10 of the application processor P0 manages kinds and the number of function expansion modules executed by the respective function expansion module processors P1 to Pn and at the time of execution of a new function expansion module, determines a processor whose load is small based on kinds and the number of function expansion modules which are the contents of its management.

With each of the function expansion module processors P1 to Pn provided with a function of outputting its load factor momently, the browser 10 causes the most appropriate processor determined based on these load factors to execute a function expansion module.

The browser records a kind of function expansion module to be executed without executing a function expansion module until interpretation of the description of one page of an HTML document is completed. After the interpretation is completed, check a kind of function expansion module to be executed and the amount of load of the same to cause the function expansion module processors P1 to Pn allowed to execute function expansion modules to execute the modules so as to have loads evenly distributed.

A processor being instructed to execute a function expansion module instructs other processor to execute a function expansion module by autonomous task migration or the like, thereby distributing loads.

The application parallel processing system according to the above-described mode of implementation and embodiment can be realized by a parallel processing program having the respective functions of the function expansion parallel unit and the function expansion parallel subsidiary unit. The parallel processing program is stored in a recording medium such as a magnetic disk, a semiconductor memory or the like and loaded into a computer processing device from the recording medium to control operation of the computer processing device, thereby realizing each of the above-described functions.

Although the present invention has been described in the foregoing with respect to the preferred mode of implementation and embodiment, the present invention is not limited to the above-described mode of implementation and embodiment but can be embodied in various forms within the scope of its technical idea.

As described in the foregoing, the present invention enables, without making any modification in an existing application operable on a single processor and having a function of executing a function expansion module, parallel processing of the application and its function expansion modules such as add-in software and a plug-in on a multi-processor.

In addition, the present invention enables an application to be operated smoothly even in such a data processing device internally provided with a processor whose processing capacity is small as a portable terminal by conducting, on a multi-processor, the parallel processing of the application and its function expansion modules such as add-in software and a plug-in.

Furthermore, by conducting, on a multi-processor, the parallel processing of an application and its function expansion modules such as add-in software and a plug-in, the present invention enables power consumption to be lower than that required when they are operated on a single processor. This is effective particularly for data processing devices such as portable terminals including a cellular phone and a portable PC whose long-time drive with low power consumption is demanded.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. An application parallel processing system which operates an application having a function of executing function expansion modules including add-in software and a plug-in on a multi-processor, wherein on specific one of processors forming said multi-processor, said application is operated independently of other processors, and on other processors, said function expansion module is operated in parallel processing under control of said applications, and wherein:

at the time of activation of said application, said function expansion module correlated in advance is loaded in said other processor, said application includes execution means for executing an original function and control means for controlling execution of said function expansion module, and said other processor is mounted with subsidiary means for controlling execution of said function expansion module as an agent of said control means in response to an instruction from said control means.

2. The application parallel processing system as set forth in claim 1, wherein said application is a browser for displaying an HTML document, and said function expansion module is a plug-in to be executed by said browser.

3. The application parallel processing system as set forth in claim 1, wherein said application is a browser for displaying an HTML document, said function expansion module is a plug-in to be executed by said browser, on specific one of processors forming said multi-processor, said application is operated independently of other processors, on other processors, said function expansion module is operated in parallel processing under control of said application, and at the time of activation of said application, said function expansion module correlated in advance is loaded in said other processor.

4. The application parallel processing system as set forth in claim 1, wherein when the need of executing said function expansion module arises in said execution means of said application, said execution means notifies said control means of processing by said function expansion module and receives a response from said control means to the effect that the notification has been received to continue execution of said original function, said control means having received the notification responds to said execution means to the effect that the notification has been received, as well as transmitting the notified processing contents to said subsidiary means of any of said other processors, and said subsidiary means of said other processor controls execution of a predetermined function expansion module based on said processing contents received.

5. The application parallel processing system as set forth in claim 1, wherein said subsidiary means of said other processor controls execution of said function expansion module of a kind predetermined for each processor.

6. The application parallel processing system as set forth in claim 1, wherein said application includes means for managing kinds and the number of said function expansion modules executed by other processors and at the time of executing a new function expansion module, instructs said other processor whose load is small to execute said function expansion module based on said kinds and number of function expansion modules.

7. The application parallel processing system as set forth in claim 1, wherein with said other processor provided with a function of outputting its own load factor momently, said application causes said other processor determined to be most appropriate based on the output load factor to execute a function expansion module.

* * * * *